United States Patent [19]

Shannon et al.

[11] 3,798,957

[45] Mar. 26, 1974

[54] METER PROVER APPARATUS

[75] Inventors: Charles G. Shannon; Bernard M. Moroney, both of Tulsa; Jack R. Neal, Claremore, all of Okla.

[73] Assignee: Metric, Inc., Tulsa, Okla.

[22] Filed: Mar. 16, 1972

[21] Appl. No.: 235,122

[52] U.S. Cl. ............................... 73/3, 137/625.43
[51] Int. Cl. ............................................ G01f 25/00
[58] Field of Search ................... 73/3; 137/625.43; 277/212 F; 92/85, 129, 244

[56] References Cited
UNITED STATES PATENTS

| | | | |
|---|---|---|---|
| 3,738,153 | 6/1973 | Simmons | 73/3 |
| 3,295,357 | 1/1967 | Halpine et al. | 73/3 |
| 3,382,772 | 5/1968 | Kampert et al. | 92/85 X |
| 3,504,523 | 4/1970 | Layhe | 73/3 |
| 3,131,611 | 5/1964 | McLaughlin | 92/244 |
| 3,682,198 | 8/1972 | Davis et al. | 73/3 X |
| 3,387,483 | 6/1968 | Van Arsdale | 73/3 |
| 3,246,666 | 4/1968 | Park et al. | 73/3 X |
| 3,638,475 | 2/1972 | Grove et al. | 73/3 |

*Primary Examiner*—Richard C. Queisser
*Assistant Examiner*—Daniel M. Yasich
*Attorney, Agent, or Firm*—Dunlap, Laney, Hessin & Dougherty

[57] ABSTRACT

The present invention relates to an improved meter prover apparatus comprised of a prover barrel, a piston or sphere disposed within the prover barrel which is moved through the barrel by the flow of liquid therethrough and means attached to the prover barrel for detecting the passage of the piston so that the known volume of liquid displaced thereby is compared with the volume of liquid measured by a meter being proved. A first elongated cylinder having a metered liquid inlet positioned intermediate to the ends thereof and a second elongated cylinder having a displaced liquid outlet positioned intermediate to the ends thereof are provided. Conduit means connecting opposite ends of the first and second cylinders together and to opposite ends of the prover barrel are provided and piston means are disposed in each of the first and second elongated cylinders. Means for selectively moving the piston means within the first and second cylinders to alternate positions between the intermediate portions thereof and the ends thereof are provided so that metered liquid passing into the first cylinder by way of the mtered liquid inlet is caused to flow through the prover barrel in a selected direction, and displaced liquid from the prover barrel is caused to flow into the second cylinder from where it is removed by way of the displaced liquid outlet.

10 Claims, 7 Drawing Figures

PATENTED MAR 26 1974

METER PROVER APPARATUS

BACKGROUND OF THE INVENTION

1. Field of the Invention

The present invention relates generally to meter prover apparatus, and more particularly, but not by way of limitation, to improved meter prover apparatus of the type employing a prover barrel through which a flow propelled piston is moved bidirectionally.

2. Description of the Prior Art

Many various types of meter prover apparatus have been developed and used for proving the accuracy of liquid flow meters. Liquid flow meters are used in many industries for measuring the quantity of liquid flowing between two points. For example, in the oil industry liquid flow meters are commonly used for determining the quantity of oil and other liquid petroleum products transferred in pipeline systems. In order to insure accurate measurement by such meters, meter prover apparatus are periodically employed to check and calibrate the meters. Generally, the meter prover apparatus utilized for this purpose have included a prover barrel or loop having a piston disposed therein which is propelled by fluid flow through the loop. Means for accurately determining the passage of the piston through the loop are provided so that the known quantity of liquid displaced thereby can be compared with the reading of the meter being checked. An interchange connects between the inlet and discharge ends of the prover loop so that the piston may be launched from the interchange into the loop and returned to the interchange after it reaches the discharge end of the loop. Such meter proving apparatus have generally been of two types, the unidirectional type and the bidirectional type.

In the unidirectional type of meter prover apparatus, the piston is always caused to move in one direction through the prover loop, and generally a plurality of valves are utilized for launching the piston into the prover loop and obtaining its return to the interchange after it reaches the discharge end of the loop.

The bidirectional type of meter prover apparatus is generally more efficient, accurate and economical to operate than the unidrectional, and more readily lends itself to automatic operation.

In bidirectional type of meter prover apparatus, valve means are utilized to reverse the flow of liquid directed through the prover loop. The valve means have been comprised of several valves or a single valve of the four-way type which is moved between two operating positions to effect flow reversal. While the use of a four-way flow diverter valve with bidirectional meter prover apparatus has achieved acceptance, such valves are expensive and subject to leakage due to valve seal failure before or during a cycle of operation of the meter prover causing inaccurate calibration data to be obtained.

By the present invention a meter prover apparatus of the bidirectional type including an improved fluid flow reversing system is provided wherein problems associated with valve leakage are obviated and automatic operation is readily achieved.

SUMMARY OF THE INVENTION

The present invention relates to an improved meter prover apparatus which comprises a prover barrel, a piston or sphere disposed within the barrel which is propelled through the barrel by the flow of liquid therethrough and means attached to the barrel for detecting the passage of the sphere or piston in either direction so that the known volume of liquid displaced thereby is compared with the volume of liquid measured by a meter being proved. A first elongated cylinder having a metered liquid inlet positioned intermediate to the ends thereof and a second elongated cylinder having a displaced liquid outlet positioned intermediate to the ends thereof are provided. Conduit means connecting opposite ends of the first and second cylinders together and to opposite ends of the prover barrel are provided, and piston means are disposed within each of the first and second elongated cylinders. Means are provided attached to the first and second cylinders for selectively moving the piston means to opposite positions between the intermediate portions of the first and second cylinders and the ends thereof so that metered liquid passing into the first cylinder by way of the metered liquid inlet is caused to flow through the prover barrel in a selected direction, and displaced liquid from the prover barrel is caused to flow into the second cylinder from where it is removed by way of the displaced liquid outlet.

It is, therefore, a general object of the present invention to provide an improved meter prover apparatus of the bidirectional type.

A further object of the present invention is the provision of an improved meter prover apparatus of the bidirectional type wherein problems associated with inaccuracy in calibrating data due to valve leakage caused by valve seal failure are obviated.

Yet a further object of the present invention is the provision of an improved meter prover apparatus wherein positive detection of leakage which will cause inaccurate calibration data to be obtained is provided.

Other and further objects, features and advantages of the present invention will be readily apparent from the following description of the invention taken in conjunction with the accompanying drawings.

DESCRIPTION OF THE PREFERRED EMBODIMENTS

Figure 1:
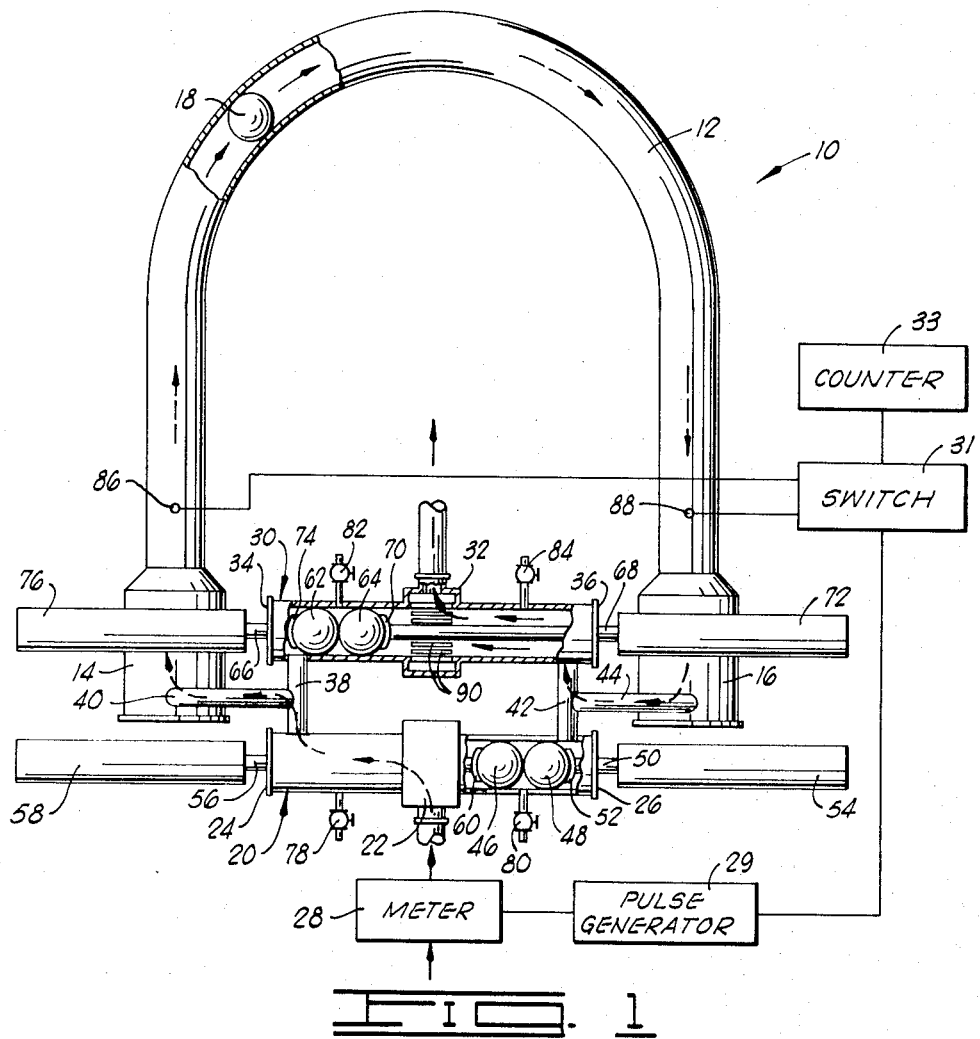
FIG. 1 is a top view of the improved meter prover apparatus of the present invention partially in section.
Figure 2:
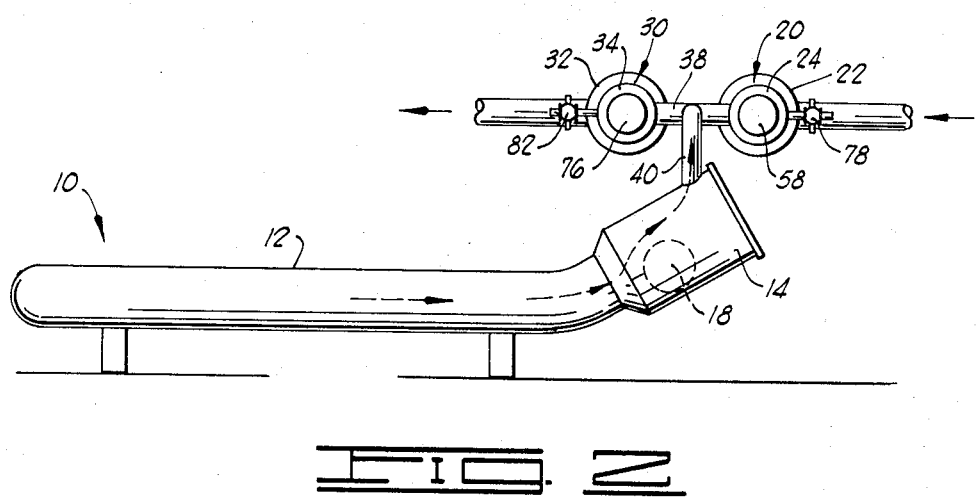
FIG. 2 is a side view of the apparatus of FIG. 1.

Referring now to the drawings, and particularly to FIGS. 1 and 2, the improved meter prover apparatus of the present invention is illustrated and generally designated by the numeral 10. The apparatus 10 basically comprises a U-shaped prover barrel 12 having enlarged end portions 14 and 16. The intermediate portion of the U-shaped barrel 12 between the ends 14 and 16 is of constant diameter, and a piston 18, generally formed in the shape of a sphere, is disposed within the barrel 12. The sphere 18 forms a seal within the intermediate portion of the barrel 12 and is propelled therethrough by the flow of liquid therethrough.

As is well understood, the purpose of the enlarged end portions 14 and 16 of the barrel 12 is to receive the sphere 18 and it is moved to one end of the barrel 12 by the effect of fluid flow. When the sphere 18 reaches one end of the barrel 12 it enters the enlarged portion 14 or 16, and because of the larger internal diameter of the portions 14 and 16, fluid flow bypasses the sphere 18 as shown by the arrows in FIG. 2. Once the sphere 18 reaches one of the enlarged portions 14 or 16, its movement is stopped, but fluid flow through the barrel 12 is allowed to continue. When the direction of fluid flow through the barrel 12 is reversed, the sphere 18 moves back into the smaller diameter intermediate portion and is propelled therethrough to the opposite end of the barrel 12. In order to facilitate the launching of the sphere 18 into the intermediate portion of the barrel 12, the ends 14 and 16 may be inclined as shown in FIG. 2. However, the barrel 12 may be designed to lie entirely in a horizontal plane if desired, and may take a variety of shapes other than the U-shape illustrated in the drawings.

Referring still to FIGS. 1 and 2, a first elongated cylinder 20 is provided having a liquid inlet 22 attached thereto positioned at a point intermediate to the ends 24 and 26 thereof. As will be further described herein, the liquid inlet 22 of the cylinder 20 is connected to the discharge side of a meter 28 to be proved. A second elongated cylinder 30 is provided having a liquid outlet 32 attached thereto positioned intermediate to the ends 34 and 36 thereof. The first and second cylinders 20 and 30 are connected together at the ends 24 and 34 thereof by a conduit 38, and a conduit 40 connects the conduit 38 to the end 14 of the barrel 12. The other ends 26 and 36 of the first and second elongated cylinders 20 and 30 are connected together by conduit 42 which is in turn connected to the end 16 of the barrel 12 by a conduit 44.

A pair of adjacently positioned resilient balls 46 and 48 having outside diameters equal to or smaller than the inside diameter of the cylinder 20 are disposed within the cylinder 20. A ram 50 is provided slidably disposed through the end 26 of the cylinder 20 positioned on a line coinciding with the axis thereof. A dish-shaped bearing member 52 is attached to the end of the ram 50 within the cylinder 20 for contacting the resilient ball 48 and a conventional hydraulic cylinder 54 is connected to the other end of the ram 50 for moving the ram 50 in directions parallel to the axis of the cylinder 20. A ram 56 identical to the ram 50, but facing in the opposite direction is provided slidably disposed through the end 24 of the cylinder 20. The ram 56 is connected to a hydraulic cylinder 58 and includes a dish-shaped bearing member 60 for contacting the ball 46. As will be understood, the bearing members 52 and 60 of the rams 50 and 56 respectively, face each other so that the inward movement of the rams 50 and 56 on a line coinciding with the axis of the cylinder 20 causes the balls 46 and 48 to be forced towards one another and outwardly against the inside walls of the cylinder 20. Further, the rams 50 and 56 and the hydraulic cylinders 54 and 58 attached thereto are of lengths such that the balls 46 and 48 may be moved to alternate positions between the ends 24 and 26 of the cylinder 20.

A pair of adjacent resilient balls 62 and 64 having outside diameters equal to or smaller than the inside diameter of the cylinder 30 are provided therein. A pair of rams 66 and 68 identical to the rams 50 and 56 associated with the cylinder 20 described above are slidably disposed through the ends 34 and 36 of the cylinder 30. The ram 68 includes a dish-shaped bearing member 70 for contacting the ball 64 and a hydraulic cylinder 72 attached to the other end for moving it in directions parallel with the axis of the cylinder 30. The ram 66 includes a dish-shaped bearing member 74 for contacting the ball 62 and a hydraulic cylinder 76 attached to the other end thereof. The rams 66 and 68 are positioned facing one another so that appropriate movement of the rams brings about the movement of the balls 62 and 64 between the ends 34 and 36 of the cylinder 30. Further, the resilient balls 62 and 64 will be forced together by the rams 66 and 68 thereby causing the balls to seal against the inside walls of the cylinder 30.

A pair of vent valves 78 and 80 are provided attached to the cylinder 20 and a pair of vent valves 82 and 84 are attached to the cylinder 30. The vent valves 78 and 80 are positioned with respect to the cylinder 20 so that when the balls 46 and 48 are positioned therein between the liquid inlet 22 and either end 24 or 26 of the cylinder 20, the space between the balls 46 and 48 may be vented. That is, the vent valve 78 is positioned intermediate to the end 24 and the liquid inlet 22 of the cylinder 20 so that when the balls 46 and 48 are positioned between the end 24 and the inlet 22, the space between the balls 46 and 48 may be vented by opening the vent valve 78. The vent valve 80 is positioned intermediate to the inlet 22 and the end 26 of the cylinder 20, and the vent valves 82 and 84 are positioned on cylinder 30 in a similar manner, i.e., the vent valve 82 is positioned intermediate to the liquid outlet 32 and the end 34 of the cylinder 30, and the vent valve 84 is positioned intermediate to the liquid outlet 32 and the end 36 of the cylinder 30.

A pair of piston detecting means 86 and 88 are attached to the barrel 12 for detecting the passage of the sphere 18 within the barrel 12. As is well understood by those skilled in the art, the meter 28 is provided with a pulse generator 29 which produces an electrical pulse output proportional to the measured flow of liquid through the meter 28. The output of the pulse generator 29 is connected in a conventional manner to a switch means 31 which is in turn connected to the piston detector means 86 and 88. The output of the switch 31 is connected to a conventional counter 33. In operation of the meter prover apparatus 10, the movement of the sphere 18 within the barrel 12 first engages one of the piston detector switches 86 and 88 to initiate the switch 31 and the counting of the pulse output of the pulse generator 29 by the counter 33. When the sphere 18 reaches the other of the detectors 86 and 88, the count is automatically stopped by the switch 31.

Figures 4, 5:
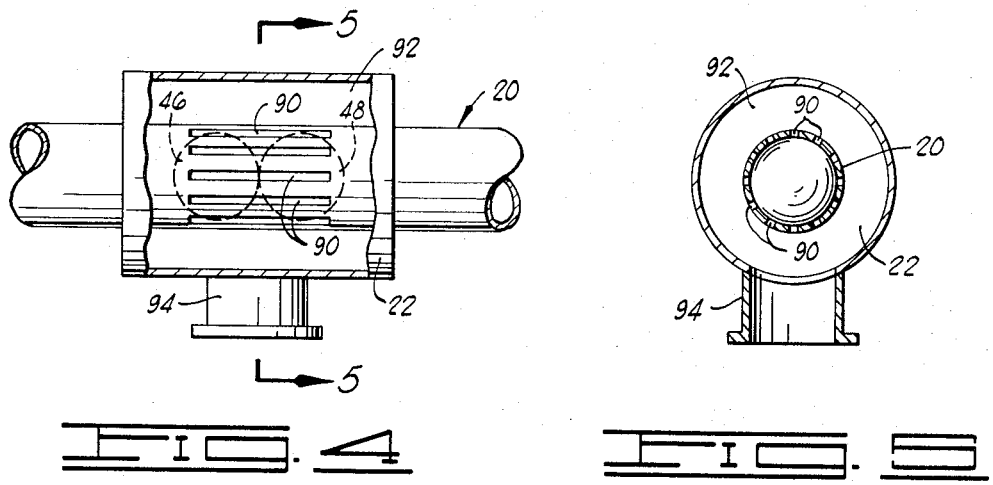
FIG. 4 is an enlarged view of yet another portion of the apparatus of FIG. 1 partially in section.
FIG. 5 is a sectional view taken along line 5—5 of FIG. 4.

Referring now to FIGS. 4 and 5, the liquid inlet 22 attached to the first cylinder 20 is illustrated in detail. The cylinder 20 includes a plurality of slots 90 formed in the walls thereof positioned on lines parallel to the axis of the cylinder 20. The slots 90 are preferably positioned symmetrically around the periphery of the cylinder 20 at a point intermediate to the ends 24 and 26 thereof. Each of the slots 90 is of a length greater than the diameter of either of the balls 46 or 48 so that the flow of liquid through the slots 90 is not cut off or restricted by the balls 46 and 48 as they are moved to opposite ends of the cylinder 20. A sealed housing 92 is provided attached to the outside of the cylinder 20 positioned so that the slots 90 open into the housing 92. A connection or nozzle 94 is attached to the housing 92. The outlet 32 of the cylinder 30 is identical to the inlet 22 of the cylinder 20. That is, a plurality of elongated slots are formed in the walls of the cylinder 30 at a position intermediate to the ends 34 or 36 thereof and a sealed housing having a nozzle attached thereto is attached to the cylinder 30 over the slots.

Operation of the Apparatus 10

The apparatus 10 may be portable so that it can be utilized for proving meters at various locations, or alternatively, the apparatus 10 may be permanently installed in a pipeline system, and either automatically or manually operated to prove one or more meters on a periodic basis. In either case, the metered liquid inlet 22 of the cylinder 20 is connected to the conduit system containing a meter to be proved downstream of the meter so that liquid measured by the meter is caused to flow into the apparatus 10 by way of the cylinder 20. The liquid outlet 32 of the cylinder 30 is connected to the conduit system containing the meter so that the liquid flow diverted through the apparatus 10 is returned to the conduit system. Generally, a permanent test manifold is provided in the conduit system containing the meter just downwstream thereof for routing metered liquid through the test apparatus.

Referring specifically to FIG. 1, the resilient balls 46 and 48 in the cylinder 20 are moved to a position between the metered liquid inlet 22 and the end 26 thereof by the rams 50 and 56. Once the balls 46 and 48 are moved to the desired position in the cylinder 20 pressure is maintained on the balls 46 and 48 by the rams 50 and 56 so that the balls are forced together and a seal between the balls and the inside walls of the cylinder 20 is insured. The resilient balls 62 and 64 are positioned within the cylinder 30 between the displaced liquid outlet 32 and the end 34 thereof. As will be understood by those skilled in the art, conventional hydraulic control apparatus are connected to the hydraulic cylinders 54, 58, 73 and 76 for operating the cylinders and moving the rams 50, 56, 66 and 68 in a desired manner. When the balls 46, 48, 62 and 64 are positioned within the cylinders 20 and 30 as shown in FIG. 1, the metered liquid flowing into the apparatus 10 by way of the metered liquid inlet 22 passes through the cylinder 20, the conduits 38 and 40 and into the end 14 of the barrel 12. The flow of liquid through the barrel 12 causes the sphere 18 to be moved into the intermediate portion thereof of reduced internal diameter. The sphere 18 is propelled past the detector switch 86 and through the barrel 12 by the flow of liquid therethrough. As the sphere 18 travels towards the end 16 of the barrel 12, its passage is detected by the switch 88. Liquid displaced from the barrel 12 passes therefrom by way of the conduits 44 and 42 into the cylinder 30. From the cylinder 30 the displaced liquid passes out of the apparatus 10 by way of the outlet 32. Once the sphere 18 reaches the end 16 of the barrel 12, additional liquid passing through the barrel 12 bypasses the sphere 18 and flows out of the apparatus 10. As described above, the known volume of liquid displaced by the sphere 18 as it passes between the detecting means 86 and 88 is compared with the reading of the counter 33 in proving the meter 28.

Once the sphere 18 has moved from the end 14 to the end 16 of the barrel 12, the flow of metered liquid through the barrel 12 is reversed so that the sphere 18 is propelled from end 16 to the end 14 thereof.

Figure 3:
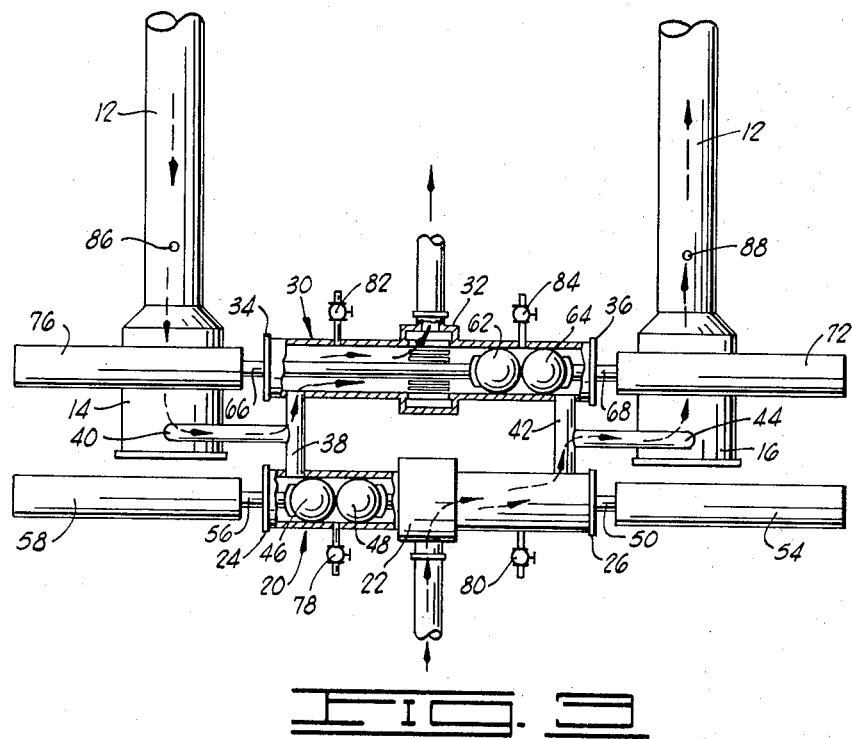
FIG. 3 is an enlarged view of a portion of the apparatus of FIG. 1 partially in section.

Referring now to FIG. 3, the apparatus 10 is illustrated with the flow of metering liquid through the barrel 12 reversed. That is, the liquid flow is diverted through the barrel 12 in the opposite direction from that shown in FIG. 1. Specifically, the balls 46 and 48 are moved within the cylinder 20 to a position between the metered liquid inlet 22 and the end 26 thereof. The balls 62 and 64 within the cylinder 30 are moved to a position between the displaced liquid outlet 32 and the end 36 thereof. This repositioning of the balls 46 and 48 within the cylinder 20 and balls 62 and 64 within the cylinder 30 causes the metered liquid to flow from the cylinder 20 to the end 16 of the barrel 12 by way of the conduits 42 and 44 attached thereto. The flow of liquid into the end 16 of the barrel 12 causes the sphere 18 to be launched and propelled to the end 14 of the barrel 12. The liquid displaced from the barrel 12 passes by way of the conduits 40 and 38 into the cylinder 30 from where it is removed by way of the displaced liquid outlet 32.

As previously described the vent valves 78, 80, 82 and 84 are positioned so that once the balls 46, 48, 62 and 64 are positioned within the cylinders 20 and 30 the space between the balls may be vented. If a continuous stream of liquid is vented, leakage around one or more of the balls is indicated. In this event, the pressure exerted on the balls by the rams associated therewith is increased to force the balls together and against the walls of the cylinder thereby increasing the seal therebetween. As will be described further hereinbelow in connection with the alternate form of the present invention illustrated in FIG. 6, pressure gauges may be installed connected to the vent valves for visually indicating whether or not the balls are sealed against the walls of the cylinders. That is, when the balls are forced together by the rams associated therewith and if a good seal is achieved, the pressure between the balls will be greater than the pressure of the metered liquid flowing through the apparatus 10. Thus, if the pressure between the ball is greater than the pressure on either side of the balls, a good seal is indicated.

As the balls within the cylinders 20 and 30 are repositioned to reverse the flow of liquid through the barrel 12, the flow of liquid through the apparatus 10 is uninterrupted and continuous. This is due to the slots formed in the cylinders 20 and 30 being of a length greater than the diameter of the balls disposed therein. Referring specifically to FIG. 4, the balls 46 and 48 disposed within the cylinder 20 are illustrated positioned intermediate to the ends of the cylinder 20. Because the slots 90 are of a length greater than the diameter of the balls 46 and 48 a portion of the slots are exposed on one or both sides of the seals between the balls and the cylinder 20 as they are moved through the cylinder thereby allowing the continuous flow of liquid through the slots.

Alternate Form of the Present Invention

Figure 6:
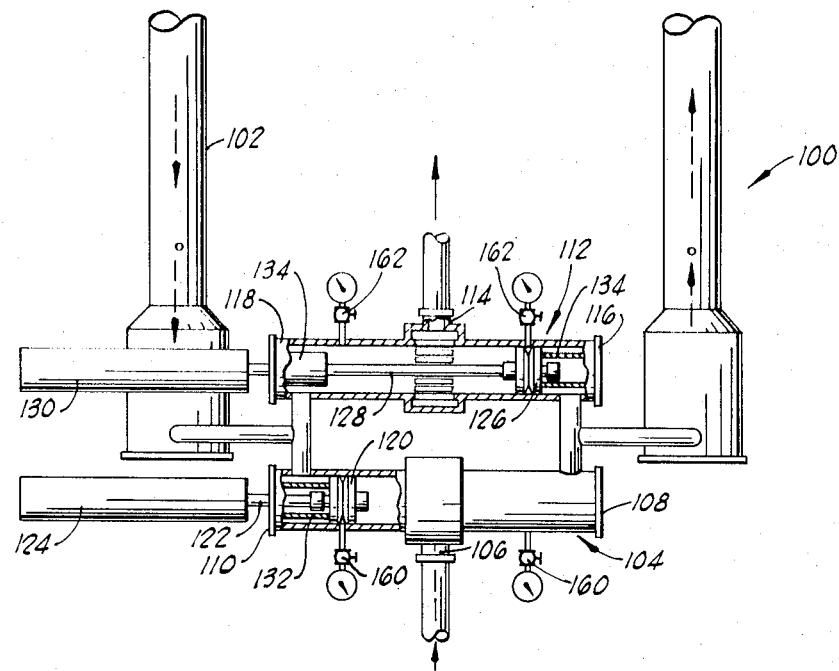
FIG. 6 is an enlarged view of a portion of an alternate form of meter prover apparatus of the present invention partially in section.

Referring now to FIG. 6, an alternate form of the present invention is illustrated and generally designated by the numeral 100. The apparatus 100 includes a U-shaped prover barrel 102 having enlarged end portions and a piston disposed therein and is identical to the prover barrel 12 described above.

A first elongated cylinder 104 is provided having a liquid inlet 106 attached thereto positioned at a point intermediate to the ends 108 and 110 thereof. A second elongated cylinder 112 is provided having a liquid outlet 114 positioned intermediate to the ends 116 and 118 thereof. The first and second cylinders 104 and 112 are identical to the cylinders 20 and 30 described above and are connected together in the same manner, i.e., the ends 108 and 116 of the cylinders 104 and 112 are connected together and to one end of the prover barrel 102 and the other ends 110 and 118 of the cylinders 104 and 112 are connected together and to the other end of the prover barrel 102.

Instead of resilient balls as described above in connection with the apparatus 10, the apparatus 100 includes a dual piston assembly disposed in each of the cylinders 104 and 112. More specifically, a dual piston assembly 120 disposed within the cylinder 104 and a dual piston assembly 126 is disposed within the cylinder 112.

The piston assembly 120 is connected to a single ram 122 slidably disposed through the end 110 of the cylinder 104 and positioned on a line coinciding with the axis thereof. A single conventional hydraulic cylinder 124 is connected to the ram 122 for moving it and the piston assembly 120 in directions parallel to the axis of the cylinder 104. A ram 128 is slidably disposed through the end 118 of the cylinder 112 and is connected to the piston assembly 126 at one end and to a conventional hydraulic cylinder 130 at the other end. A pair of stop members 132, preferably cylindrical in shape, are disposed within the cylinder 104 and attached to the ends thereof, and a pair of stop members 134 are disposed within the cylinder 112 attached to the ends thereof.

Figure 7:
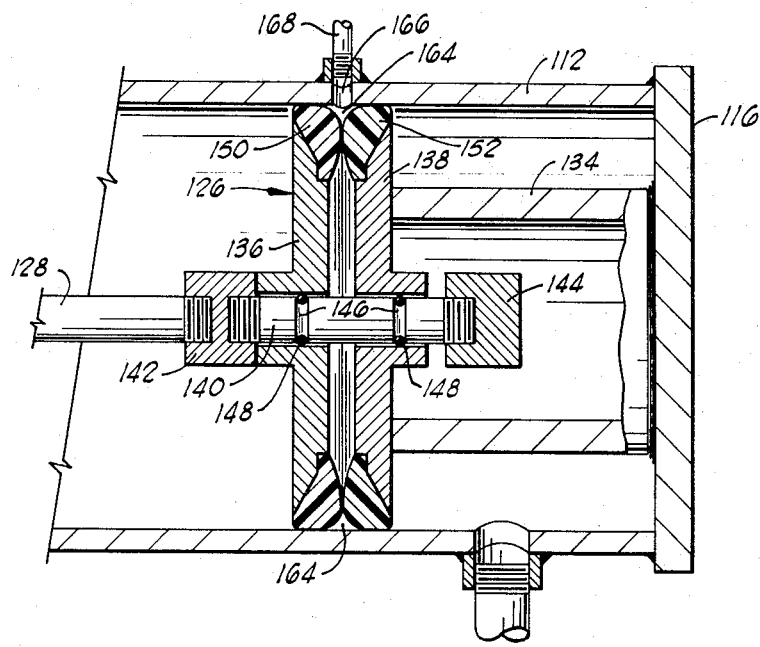
FIG. 7 is an enlarged view of a portion of the apparatus of FIG. 6, partially in section.

Referring now to FIG. 7, the dual piston assembly 126 disposed within the cylinder 112 is illustrated in detail. The piston assembly 120 disposed within the cylinder 104 is identical to the piston assembly 126 shown in FIG. 7 and the following description applies equall to both. The piston assembly 126 basically comprises a pair of circular plates 136 and 138 slidably mounted on a central shaft 140. The ends of the shaft 140 are connected to a pair of end members 142 and 144 and the end member 142 is connected to the ram 128. The shaft 140 includes a pair of continuous grooves 146 around the periphery thereof, and a pair of conventional O-ring sealing members 148 are positioned in the grooves 146. The O-rings 148 function to form seals between the shaft 140 and the plates 136 and 138.

The plate 136 includes an annular resilient sealing member 150 bonded to the peripheral surface thereof, and the plate 138 includes a sealing member 152 bonded thereto. The sealing members 150 and 152 are positioned and formed in a shape such that when the plates 136 and 138 are forced towards each other, the sealing members 150 and 152 are forced together and deformed into sealing contact with the inside walls of the cylinder 112.

Operation of the apparatus 100

The operation of the apparatus 100 in proving meters is identical to the operation of the apparatus 10 described above. That is, metered liquid may be caused to flow through the apparatus 100 in either direction so that a piston or sphere is propelled through the prover barrel 102 between detection means. However, instead of four hydraulic cylinders and rams, the apparatus 100 includes only two hydraulic cylinders 124 and 130 which function to selectively move the rams 122 and 128 and the piston assemblies 120 and 126 disposed within the cylinders 104 and 112. As will be understood, when it is desired to reverse the flow of metered liquid through the apparatus 100 from the direction illustrated by the arrows in FIG. 6, the piston assembly 126 is moved to the opposite end of the cylinder 112 and the piston assembly 120 is moved to the opposite end of the cylinder 104.

As can best be seen in FIG. 7, when the piston assembly 126 is moved to the end 116 of the cylinder 112, the plate 138 comes into contact with the stop member 134 attached to the end 116 of the cylinder 112. This causes the plate 138 to be moved on the shaft 140 into contact with the plate 136, and both the plates 136 and 138 to be moved on the shaft 140 until the plate member 136 is contacted by the end member 142 connected to the shaft 140. As the ram 128 forces the piston member 126 further towards the end 116 of the cylinder 112, the plates 136 and 138 are resilient sealing members 150 and 152 attached thereto are forced together. As previously described, the pressure exerted on the resilient sealing members 150 and 152 causes them to press against the inside surfaces of the cylinder 112 thereby forming a seal against the cylinder 112. When the piston member 126 is moved to the opposite end of the cylinder 112, the stop member 134 causes the plates 136 and 138 to slide on the shaft 140 until the plate member 138 is contacted by the end member 144 attached to the shaft 140. As the ram 128 is moved further towards the end 118 of the cylinder 112, the plates 136 and 138 and resilient sealing members 150 and 152 are forced towards each other thereby causing seals to be obtained.

The O-rings 148 disposed between the shaft 140 and the plates 136 and 138 prevent fluid communication from one side of the piston assembly 126 to the other by way of the space between the plates 136 and 138 and the shaft 140. As will be understood, the piston assembly 120 is identical to the piston assembly 126 and operates in conjunction with the stop members 132 in an identical manner to that described above.

As shown in FIG. 6, a pair of vent valves 160 are attached to the cylinder 104, and a pair of vent valves 162 are attached to the cylinder 112. The operation of the vent valves 160 and 162 for verifying whether or not a seal exists between the piston assemblies and the cylinders of the apparatus 100 is the same as that described above for the apparatus 10. As shown in FIG. 6, a pressure gauge may be connected to each of the vent valves 160 and 162 for visually indicating the existence or non-existence of a good seal between the piston assemblies 120 and 126 and the cylinders 104 and 112 respectively. That is, referring to FIG. 7, as the sealing members 150 and 152 connected to the plates 136 and 138 respectively, are forced together, the space 164 between the sealing members 150 and 152 and the inside walls of the cylinder 112 is reduced. As the space 164 is reduced in size the pressure of liquid trapped therein is elevated provided a good seal exists between the members 150 and 152 and the walls of the cylinder 112. The final increased pressure level of the liquid within the space 164 is transmitted by way of a connection 166 disposed through the wall of the cylinder 112 and positioned between the sealing members 150 and 152. A conduit 168 is connected to the connection 166 and to the vent valve 162 and pressure gauge (not shown).

The present invention, therefore, is well adapted to carry out the objects mentioned as well as those inherent therein. While the invention has been described with reference to preferred embodiments thereof, it will be readily apparent to those skilled in the art that numerous changes in the details of construction and arrangement of parts may be made without departing from the spirit of the invention as defined by the appended claims.

What is claimed is:

1. An improved meter prover apparatus which comprises:
    a prover barrel having first and second ends;
    a piston disposed within the prover barrel which is moved through the barrel by the flow of liquid therethrough;
    means attached to the barrel for detecting the passage of the piston in either direction so that volume of liquid displaced thereby is compared with the volume of liquid measured by a meter being proved;
    a first elongated cylinder having a longitudinal axis and first and second ends and having a liquid inlet positioned intermediate the first and second ends thereof;
    a second elongated cylinder having a longitudinal axis and first and second ends and having a liquid outlet positioned intermediate the first and second ends thereof;
    conduit means connecting the first ends of the first and second cylinders together and to the first end of the prover barrel;
    conduit means connecting the second ends of the first and second cylinders together and to the second end of the prover barrel;
    piston means disposed in each of the first and second cylinders for moving within the respective cylinders, each of said piston means including a pair of adjacently positioned seal means having resilient peripheries for providing a seal between said piston means and the inside wall of the respective cylinder when said pair of seal means are forced toward each other when said piston means is in either of the opposite positions between the intermediate portion of the respective cylinder and the respective ends thereof;
    means operatively engaging each of said piston means for selectively moving said piston means within the first and second cylinders to opposite positions between the intermediate portions thereof and the ends thereof so that metered liquid passing into the first cylinder by way of the liquid inlet is caused to flow through the prover barrel in a selected direction, and displaced liquid from the prover barrel is caused to flow into the second cylinder from where it is removed by way of the liquid outlet;
    means operatively engaging each pair of adjacently positioned seal means for forcing a respective pair of seal means toward each other thereby causing the resilient peripheries thereof to seal with the inside wall of the respective cylinder;
    each said piston means being characterized further to include:
    a shaft; and
    said pair of seal means, said pair of seal means being characterized further to include: a pair of adjacent plate members slidably disposed on said shaft; and a pair of oppositely facing annular resilient sealing members having outside diameters substantially equal to to the inside diameter of the cylinder, said sealing members being attached to the peripheries of the plate members and positioned so that when the plate members are moved towards each other on the shaft the sealing members are forced into sealing contact with the inside surface of the cylinder;
    wherein the liquid inlet of the first elongated cylinder and the liquid outlet of the second elongated cylinder are each comprised of: a plurality of elongated slots formed in the wall of a respective said cylinder at a point intermediate the ends thereof;
    a sealing housing attached to a respective said cylinder positioned so that said slots open into said housing; and
    a liquid connection attached to the respective said housing; and
    wherein said slots are positioned in spaced relation around the walls of said cylinders and are aligned along lines substantially parallel with the axes of said cylinders, each of said slots being of a length greater than the longitudinal distance between each said pair of oppositely facing resilient sealing members disposed within said cylinders.

2. The apparatus of claim 1 which is further characterized to include vent valves attached to each of the first and second cylinders, the vent valves being positioned so that the spaces between the sealing members may be vented when the sealing members are positioned between the intermediate portions and the ends of said cylinders.

3. The prover apparatus of claim 2 wherein the means operatively engaging each of said piston means for selectively moving the piston means to positions between the intermediate portions and the ends thereof comprises:
    ram means slidably disposed through one end of each of said first and second cylinders and attached to the shaft of the piston means disposed therein for moving the piston means within the respective cylinder;
    power cylinder means attached to each of the ram means for causing movement thereof;
    a pair of stop members disposed in each of the cylinders attached to opposite ends thereof; and
    means for selectively activating the power cylinder means attached thereto whereby the piston means may be moved to alternate positions within the cylinders into contact with the stop members so that the resilient sealing members thereof are forced towards each other and caused to seal against the inside walls of the cylinders.

4. An improved meter prover apparatus which comprises:
    a prover barrel having enlarged ball receiving portions at the first and second ends thereof and a central portion of substantially constant diameter;

a ball disposed within the prover barrel having an external diameter substantially equal to the internal diameter of the central portion of the barrel, said ball forming a sealed piston which is moved through the barrel by the flow of liquid therethrough;

means for detecting the passage of the ball through the prover barrel in either direction so that the known volume of liquid displaced by the movement of the ball is compared with the volume of liquid measured by the meter being proved;

a first elongated cylinder having a liquid inlet positioned intermediate the first and second ends thereof;

a second elongated cylinder having a liquid outlet positioned intermediate the first and second ends thereof;

first conduit means interconnecting the first ends of the first and second cylinders and the first end of the prover barrel;

second conduit means interconnecting the second ends of the first and second cylinders and the second end of the prover barrel;

a pair of adjacently positioned resilient spherical balls disposed within each of the first and second cylinders, said balls having uninterrupted spherical external surfaces and having outside diameters substantially equal to the inside diameters of the cylinders;

means attached to the first and second cylinders for selectively moving the balls within the first and second cylinders to positions between the intermediate portions thereof and the ends thereof so that metered liquid passing into the first cylinder by way of the liquid inlet is caused to flow through the prover barrel in a selected direction, and displaced liquid from the prover barrel is caused to flow into the second cylinder from where it is removed by way of the liquid outlet;

means operatively engaging each pair of adjacently positioned resilient spherical balls for forcing the respective pair of balls toward each other thereby causing the resilient peripheries thereof to seal with the inside wall of the respective cylinder; and wherein the means attached to the first and second cylinders for selectively moving the balls to positions between the intermediate portions and the ends thereof is characterized further to include:

a pair of opposing hydraulically operated rams slidably disposed through the ends of each of the cylinders; and means for selectively activating the hydraulic rams so that the balls may be moved to alternate positions between the ends of the cylinders and forced towards each other thereby causing the peripheries of the balls to seal with the inside surfaces of the cylinders.

5. The prover apparatus of claim 4 wherein the metered liquid inlet of the first elongated cylinder and the displaced liquid outlet of the second elongated cylinder are each comprised of:

a plurality of elongated parallel slots symmetrically positioned intermediate to the ends of the respective cylinder, each of the slots lying on a line parallel to the axis of the respective cylinder and having length greater than the diameter of the resilient balls disposed therein;

a sealed housing attached to the outside wall of the respective cylinder positioned so that said slots open into the housing; and a liquid connection attached to the respective housing.

6. The prover apparatus of claim 4 which is further characterized to include vent valves attached to each of the first and second cylinders, said vent valves being positioned so that the spaces between the resilient balls may be vented when the resilient balls are positioned between the intermediate portions and the ends of the cylinders.

7. An improved meter prover apparatus which comprises:

a prover barrel having enlarged ball receiving portions at the ends thereof and a central portion of substantially constant diameter;

a ball disposed within the prover barrel having an external diameter substantially equal to the internal diameter of the central portion of the barrel, said ball forming a sealed piston which is moved through the barrel by the flow of liquid therethrough;

means for detecting the passage of the ball through the prover barrel in either direction so that the known volume of liquid displaced by the movement of the ball is compared with the volume of liquid measured by a meter being proved;

a first elongated cylinder having a metered liquid inlet positioned intermediate to the ends thereof;

a second elongated cylinder having an outlet for said displaced liquid positioned intermediate to the ends thereof;

conduit means connecting opposite ends of each of the first and second cylinders together and to opposite ends of the prover barrel;

piston means disposed within each of the first and second cylinders, said piston means each comprising:

a shaft;

a pair of adjacent plate members a pair of oppositely facing annular resilient sealing members having outside diameters substantially equal to the inside diameter of the cylinder, said sealing member being attached to the peripheries of the plate members and positioned sp that when the slidable plate members are moved towards each other on the shaft the sealing members are deformed into sealing contact with the inside surfaces of the cylinders; and means operatively connected the first and second cylinders for selectively moving the piston means within the first and second cylinders to positions between the intermediate portions thereof and the ends thereof so that metered liquid passing into the first cylinder by way of the metered liquid inlet is caused to flow through the prover barrel in a selected direction, and displaced liquid from the prover barrel is caused to flow into the second cylinder from where it is removed by way of the displaced liquid outlet.

8. The apparatus of claim 7 which is further characterized to include vent valves attached to each of the first and second cylinders, the vent valves being positioned so that the spaces between the sealing members may be vented when the sealing members are positioned between the intermediate portions and the ends of said cylinders.

9. The apparatus of claim 8 wherein the means operatively connected to the first and second cylinders for selectively moving the piston means to positions between intermediate portions and the ends thereof comprises:
- a ram slidably disposed through one end of each of the cylinders and attached to the shaft of the piston means disposed therein;
- power cylinder means attached to each of the rams for causing the movement thereof;
- a pair of stop members disposed in each of the cylinders attached to the opposite ends thereof; and
- means for selectively activating the power cylinder means attached thereto whereby the piston means may be moved to alternate positions within the cylinders into contact with the stop members so that the resilient sealing members thereof are forced towards each other and caused to seal against the inside walls of the cylinders.

10. The apparatus of claim 9 wherein the metered liquid inlet of the first elongated cylinder and the displaced liquid outlet of the second elongated cylinder are each comprised of:
- a plurality of elongated parallel slots symmetrically positioned intermediate to the ends of the respective cylinder, each of the slots lying on a line parallel to the axis of the respective cylinder and having a length greater than the distance between the resilient sealing members disposed therein;
- a sealed housing attached to the outside wall of the respective cylinder positioned so that said slots open into the housing; and
- a liquid connection attached to said respective housing.

* * * * *

UNITED STATES PATENT OFFICE
CERTIFICATE OF CORRECTION

Patent No. 3,798,957          Dated March 26, 1974

Inventor(s) George G. Shannon, Bernard M. Moroney and Jack R. Neal

It is certified that error appears in the above-identified patent and that said Letters Patent are hereby corrected as shown below:

In the Abstract, line 22, "mtered" should be --metered--.

In Column 3, line 8, "and" should be --as--.

In Column 5, line 46, "73" should be --72--.

In Column 6, line 9, "metering" should be --metered--.

In Column 6, line 47, "ball" should be --balls--.

In Column 10, line 53, after the word "causing" insert the word --the--.

In Column 12, line 42, after the word "members" insert the following: --slidably positioned on said shaft;--

In Column 12, line 47, "sp" should be --so--.

In Column 12, line 52, after the word "connected" insert the word --to--.

Signed and sealed this 6th day of August 1974.

(SEAL)
Attest:

McCOY M. GIBSON, JR.
Attesting Officer

C. MARSHALL DANN
Commissioner of Patents